UNITED STATES PATENT OFFICE.

JOHN R. DAVIS, CLARENCE M. WYRICK, AND SAMUEL PARKER, OF MOUNDSVILLE, WEST VIRGINIA.

COMPOSITION FOR WALLS.

SPECIFICATION forming part of Letters Patent No. 288,694, dated November 20, 1883.

Application filed June 11, 1883. (No specimens.)

*To all whom it may concern:*

Be it known that we, J. R. DAVIS, C. M. WYRICK, and SAML. PARKER, of Moundsville, in the county of Marshall and State of West Virginia, have invented certain new and useful Improvements in Compositions for Walls; and we do hereby declare the following to be a full, clear, and exact description of the invention, such as will enable others skilled in the art to which it pertains to make and use it.

Our invention relates to an improvement in a composition which is to be applied to brick, concrete, and stone walls for the purpose of giving them the appearance of pressed brick; and it consists in the combination of a compound which is applied evenly over the surface of the wall, with a second compound which is of a different color, and which is used in connection with the first for the purpose of giving the appearance of mortar, as will be more fully described hereinafter.

The first compound, which is to be applied over the surface of the brick or stone walls, like a coating of plaster, consists of one-tenth part sodium chloride, one part calcium oxide, one part iron sesquioxide, and three parts silica. Calcium oxide is converted into calcium hydrate by the water used in mixing the mass. It then holds the sesquioxide of iron, which gives the red color, and also renders the mixture less porous, thereby giving tenacity, and prevents the absorption of water to a considerable extent. The calcium hydrate also binds the sodium chloride and silica into the mass. The sodium chloride gives a gloss and smoothness to the surface, which, together with the sesquioxide of iron, renders the compound, when set to a wall, almost impervious to water. This compound, being water-proof, is also adapted to be used in preventing the dampness that is so common in many brick houses. The above-mentioned ingredients are to be mixed together with sufficient water to form a soft mass, and this mass is then to be spread over the wall to any desired thickness.

Where it is desired to imitate press-brick, it becomes necessary to use a second compound, which is of a white color, and which looks like mortar when used in connection with the red mixture. This second mixture, which is to represent the mortar, is composed of one part calcium hydrate and two parts silica. These two ingredients are to be mixed with linseed-oil into a mass of the consistency of putty, and then one-fifth part of calcium sulphate is to be mixed with it. This white mixture may be applied in lines over the surface of the red one, or the red mixture may have suitable grooves or depressions made in its surface, so as to imitate brick-work, and the white mixture applied in the grooves, so as to more closely imitate a press-brick.

Having thus described our invention, we claim—

1. A compound which is to be applied to the surface of stone, concrete, or brick walls, consisting of sodium chloride, calcium oxide, iron sesquioxide, and silica, in or about the proportions specified.

2. A compound composed of calcium hydrate, silica, linseed-oil, and calcium sulphate, as set forth.

In testimony whereof we affix our signatures in presence of two witnesses.

JOHN R. DAVIS.
C. M. WYRICK.
SAMUEL PARKER.

Witnesses:
THOS. BRANNEN,
W. L. EDWARDS.